(12) United States Patent
Cain, III et al.

(10) Patent No.: US 10,831,537 B2
(45) Date of Patent: Nov. 10, 2020

(54) DYNAMIC UPDATE OF THE NUMBER OF ARCHITECTED REGISTERS ASSIGNED TO SOFTWARE THREADS USING SPILL COUNTS

(71) Applicant: INTERNATIONAL BUSINESS MACHINES CORPORATION, Armonk, NY (US)

(72) Inventors: Harold W. Cain, III, Raleigh, NC (US); Hubertus Franke, Cortlandt Manor, NY (US); Charles R. Johns, Austin, TX (US); Hung Q. Le, Austin, TX (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 15/435,803

(22) Filed: Feb. 17, 2017

(65) Prior Publication Data
US 2018/0239604 A1 Aug. 23, 2018

(51) Int. Cl.
*G06F 9/50* (2006.01)
*G06F 9/30* (2018.01)
(Continued)

(52) U.S. Cl.
CPC .............. *G06F 9/50* (2013.01); *G06F 9/3012* (2013.01); *G06F 9/30098* (2013.01);
(Continued)

(58) Field of Classification Search
CPC .... G06F 9/3012; G06F 9/30138; G06F 9/384; G06F 9/50; G06F 9/45516; G06F 9/30098; G06F 8/441
See application file for complete search history.

(56) References Cited

U.S. PATENT DOCUMENTS 6,092,175 A 7/2000 Levy et al.
7,650,602 B2 1/2010 Amamiya et al.
(Continued)

FOREIGN PATENT DOCUMENTS

WO 2011147727 12/2011
WO 2013147895 A2 10/2013

OTHER PUBLICATIONS

Micikevicius, "Local Memory and Register Spilling", Nvidia, 2011, pp. 1-18.*

(Continued)

*Primary Examiner* — David J. Huisman
(74) *Attorney, Agent, or Firm* — F. Chau & Associates, LLC

(57) ABSTRACT

A computer system includes a processor, main memory, and controller. The processor includes a plurality of hardware threads configured to execute a plurality of software threads. The main memory includes a first register table configured to contain a current set of architected registers for the currently running software threads. The controller is configured to change a first number of the architected registers assigned to a given one of the software threads to a second number of architected registers when a result of monitoring current usage of the registers by the software threads indicates that the change will improve performance of the computer system. The processor includes a second register table configured to contain a subset of the architected registers and a mapping table for each software thread indicating whether the architected registers referenced by the corresponding software thread are located in the first register table or the second register table.

16 Claims, 6 Drawing Sheets

(51) Int. Cl.
*G06F 9/38* (2018.01)
*G06F 9/455* (2018.01)

(52) U.S. Cl.
CPC .......... *G06F 9/30123* (2013.01); *G06F 9/384* (2013.01); *G06F 9/3851* (2013.01); *G06F 9/45516* (2013.01)

(56) References Cited

U.S. PATENT DOCUMENTS

| | | |
|---|---|---|
| 2005/0138338 A1* | 6/2005 | Sodani .................. G06F 9/3824 712/225 |
| 2009/0100249 A1 | 4/2009 | Eichenberger et al. |
| 2013/0024647 A1 | 1/2013 | Gove |
| 2015/0154022 A1 | 6/2015 | Khot et al. |
| 2017/0139714 A1 | 5/2017 | Abdallah |
| 2017/0371654 A1* | 12/2017 | Bajic ..................... G06F 9/3012 |

OTHER PUBLICATIONS

Nuth et al., "The Named-State Register File: Implementation and Performance", 1995 IEEE, pp. 4-13.
Gebhart, et al., "Energy-Efficient Mechanisms for Managing Thread Context in Throughput Processors", ISCA '11, Jun. 4-8, 2011, San Jose, CA, pp. 235-246.

* cited by examiner

210

| In-flight mapping table | | | |
|---|---|---|---|
| Thread | Instruction | Arch thread | Tag |
| ST1 | opcode1 | GPR1 | PR1 |
| ST1 | opcode3 | GPR3 | PR6 |
| ST2 | opcode4 | GPR4 | PR11 |
| ST3 | opcode5 | GPR5 | PR16 |

FIG. 2

DYNAMIC UPDATE OF THE NUMBER OF ARCHITECTED REGISTERS ASSIGNED TO SOFTWARE THREADS USING SPILL COUNTS

BACKGROUND

1. Technical Field

The present disclosure relates generally to processors, and more specifically to processor threads.

2. Discussion of Related Art

Modern applications are comprised of a large set of software threads (executable tasks) that need to be dispatched to a finite set of hardware threads. This has traditionally been the responsibility of the operating system (OS). The operating system can maintain one or more run queues of executable tasks and time-shares this set of executable tasks over the available hardware threads.

Processing cores may include one or more of the hardware threads. However, the efficiency of processing cores is increasingly declining due to a memory wall problem that describes the relatively long stall latency that processor cores will experience on cache misses due to memory latency. Hence, computer architectures attempt to 'hide' the memory latency by executing different instruction streams when stalls are experienced.

The performance of a software thread executing partially depends on whether sufficient physical registers are available. A more optimal register allocation scheme is desirable, that exposes the available resources to a dynamic compiler for the running applications in order to get an overall performance advantage.

BRIEF SUMMARY

According to an exemplary embodiment of the invention, a computer system is provided including a processor and a main memory. The processor includes a plurality of hardware threads configured to execute a plurality of software threads. The processor executes an instruction set that defines a set of architected registers that a compiler may use in compiling an application. The main memory includes a first register table configured to contain the set of architected registers for the currently running software threads. The processor includes a second register table configured to contain a subset of the architected registers and a mapping table for each software thread indicating whether the valid contents for each of its architected registers is currently in the first register table or the second register table. The processor may include a controller that monitors the current usage of registers by the software threads and notifies each software thread whether the overall system performance could be improved by recompiling the thread to use a different number of architected registers, lower or higher than the number of architected registers that it is currently compiled to.

According to an exemplary embodiment of the invention, a computer-implemented method to manage operation of a software thread includes: determining, by a controller, a first number of architected registers assigned to a software thread; setting, by the controller, a software flag in memory indicating a change from the first number to the second number; sending, by the controller, an interrupt to a hardware thread executing the software thread when the controller determines the first number is to change to a second number; suspending, by an interrupt handler of the hardware thread, operation of the software thread, in response to receipt of the interrupt; accessing, by a compiler, the software flag to determine the second number; and compiling, by the compiler, the software thread to use the determined number of architected registers.

According to an exemplary embodiment of the invention, a computer program product for managing operation of a software thread is provided. The computer program product includes a computer readable storage medium having computer readable program code embodied therewith. The computer readable program code includes: computer readable program code configured to determine a first number of architected registers assigned to a software thread; computer readable program configured to set a software flag in memory indicating a change from the first number to the second number; computer readable program code configured to send an interrupt to a hardware thread executing the software thread when it is determined that the first number is to change to a second number; computer readable program code configured to suspend operation of the software thread, in response to receipt of the interrupt; computer readable program code configured to access the software flag to determine the second number; and computer code configured to compile the software thread to use the determined number of architected registers.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 2 is an example of an in-flight mapping table that may be used by the system;

DETAILED DESCRIPTION

Figure 1:
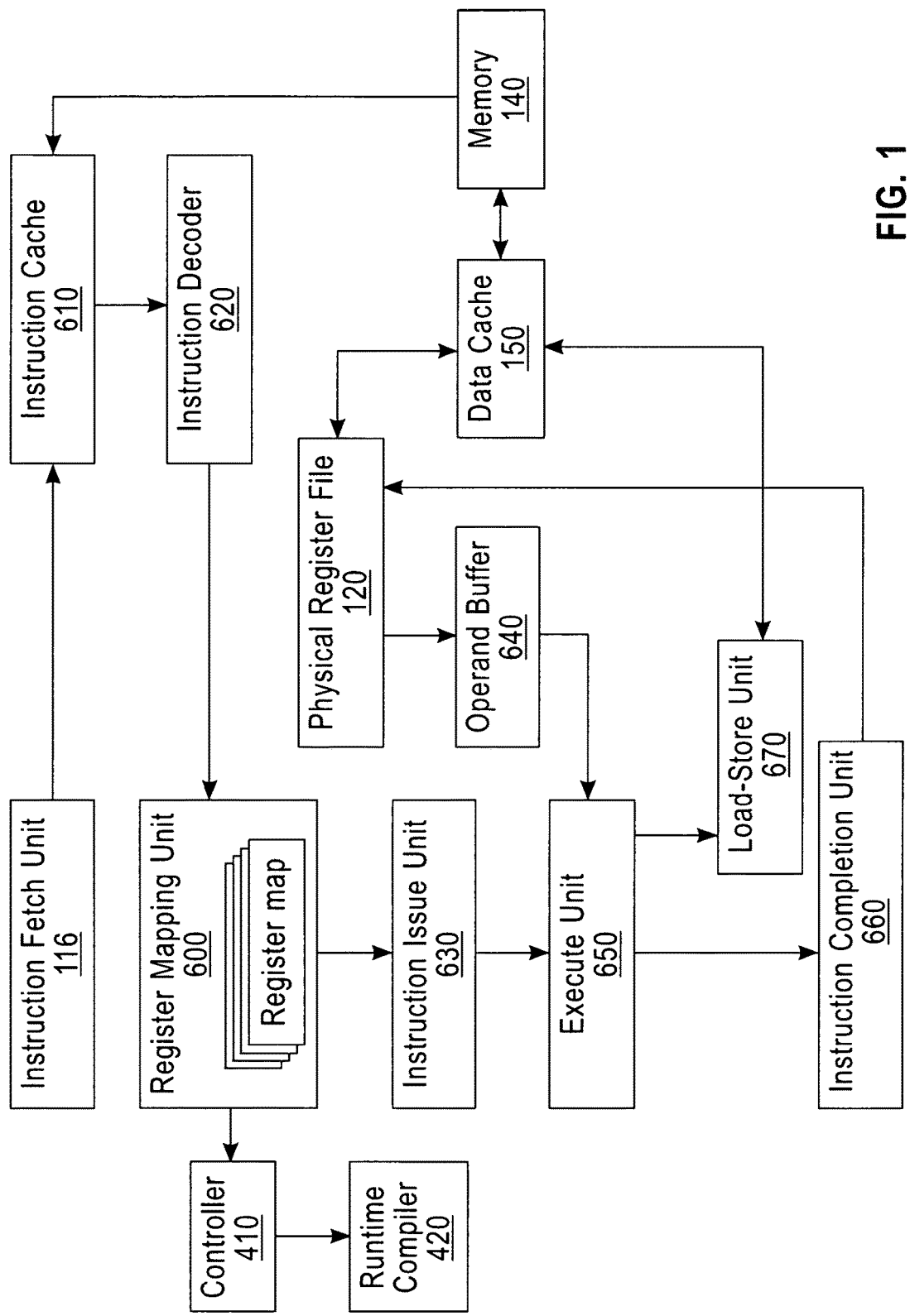
FIG. 1 is a block diagram illustrating a system according to an exemplary embodiment for managing a plurality of threads.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

FIG. 1 illustrates an example system for managing threads. The instruction fetch unit 116 fetches instructions from memory 140 through the instruction cache 610.

Fetched instructions are decoded using the instruction decoder 620. In the process of decoding, the architected registers needed by the instruction either as source operands or as destination operands are determined. These architected registers are mapped to physical registers by the register mapping unit 600. The decoded instruction with physical registers as source and destination operands are sent to the instruction issue unit 630, from where they are sent to the execute unit 650. The execute unit 650 uses the physical register names to access the source operands from an operand buffer 640 that it needs to execute the instruction. The execute unit 650 may need to access memory for Load and Store instructions, which it does using the load-store unit 670. When the instruction completion unit 660 completes an instruction, the result is sent to the physical register file 120 using a physical destination operand name as originally mapped by an instruction dispatch unit. Usage of register maps is monitored by the controller 410, which can be probed by the runtime compiler 420 to determine whether the program needs to be recompiled.

In the multi-threaded case, the flow is identical; the only change is that there are as many maps as the number of threads supported, and the appropriate map is consulted for architected-register-to-physical-register mapping.

The register mapping unit 600 is responsible for successfully converting an architected register name to a physical register name. Thus, in the case when the physical register file 120 is smaller than the total architected register size for all threads, the register mapping unit 600 is responsible for managing the physical registers, if necessary moving some of them between the register file 120 and memory 140 through the data cache 150. At the end of Instruction Dispatch, the instruction is augmented to indicate the physical register operand names as indicated in FIG. 2, which shows just one operand for each instruction. However, there could be multiple operands, including source operands and destination operands.

In an embodiment, all registers for all threads have a home location in memory 140 in the virtual register file 320. This may be a contiguous table in memory 140 that provides a default location, to which physical registers can be spilled when there is not enough room in the physical register file 120. Thus the size of this table in memory 140 is equal to the maximum number of architected registers times the number of threads. Each register for each thread has a unique home location, identified by its index in this table in memory.

Figure 3:
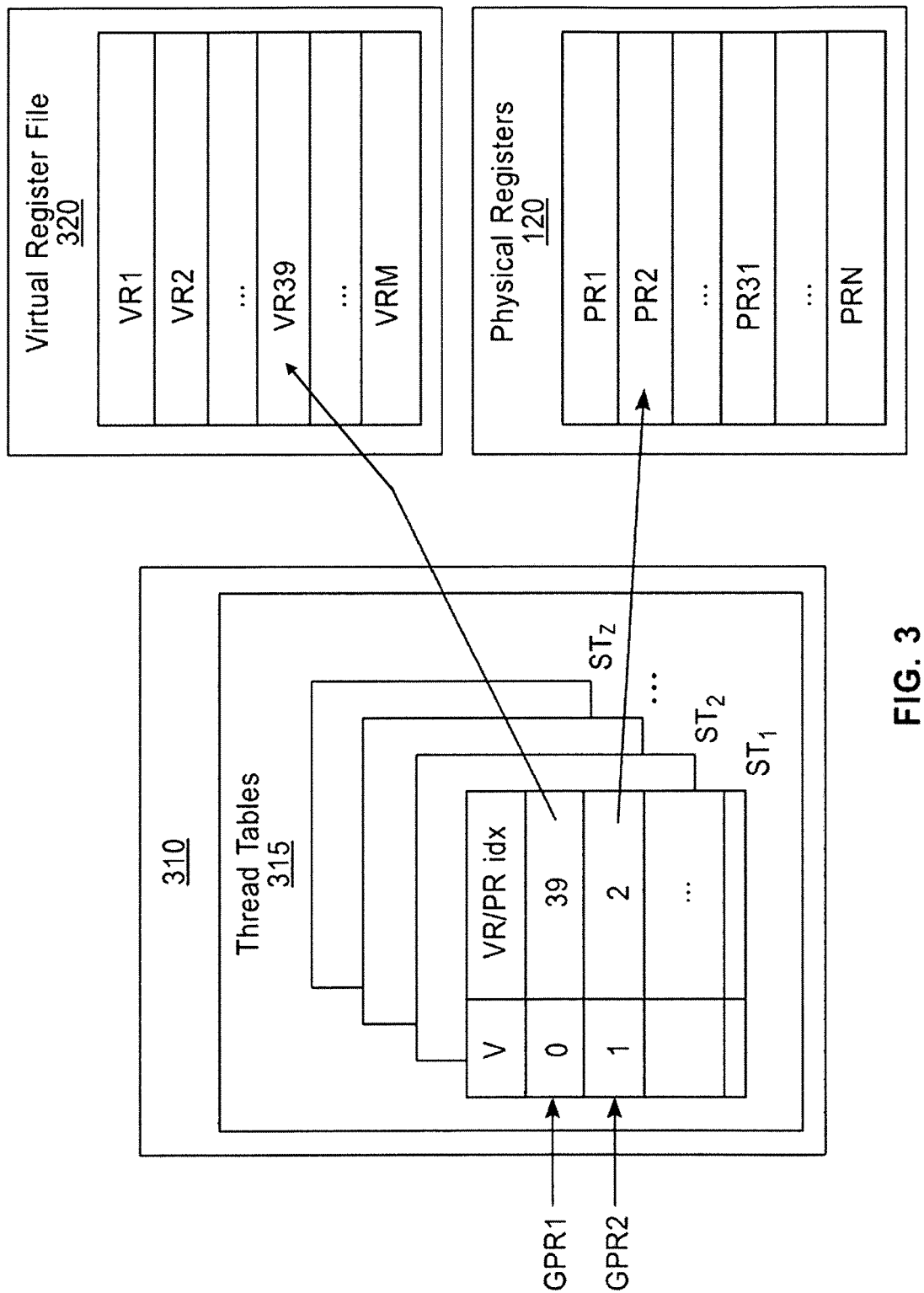
FIG. 3 illustrates mapping tables that may be used by the system to manage register renaming.

The mapping process is depicted in more detail in FIG. 3. Multiple maps are shown in the figure. Each map is associated with a thread, and has as many entries as the number of architected registers. These registers are depicted as GPRx, where x could be a number ranging from 1 through 32 for an exemplary architecture having 32 general-purpose registers. There are two fields in each entry, a valid entry and an index entry. The valid entry is 1, if the architected register has been mapped to a physical register. In this case, the actual index of that register in the physical register file 120 will be shown in the index entry. If the architected register has not been mapped to any physical register, then the index of that register in the virtual register file 320 in memory 140 is indicated in the index field. Thus any register that needs to be used has a valid copy either in the physical register file 120 or in the virtual register file 320. The performance of the machine is best when the maximum number of registers currently used by the program is mapped to the physical register file 120.

When an unmapped register is mapped, its entry is changed, setting its valid bit to 1, and its index field to the index of the physical register to which it is mapped. The contents of the home location of the register are then copied to the mapped physical register location.

At the beginning, all physical registers are maintained in a free list. None of the architected registers are mapped. Their index entries in the map are initialized to their indices in the table in memory 140. As architected registers are needed by programs, they get mapped to free physical registers listed in the free list. The free list shrinks. When a thread terminates, all physical registers that are mapped to architected registers of that thread get returned to the free list. Thus the free list grows and shrinks continually. Ideally the free list should never go down to zero, but this can happen when all the current threads use large numbers of architected registers.

In the process of allocating a physical register to an unmapped architected register, it may be necessary to evict (or spill) an existing mapped register. This eviction process involves copying the contents of the register to be evicted to its home location, so that a valid copy is saved for potential subsequent use.

There are many possible ways to determine which physical register needs to be evicted when an unmapped register needs to be mapped and when there are no entries in the free list, including least-recently-used, least-frequently-used, random, etc.

An in-flight instruction is an instruction that has been dispatched but has not completed. As shown in FIG. 2, the processor 110 maintains an in-flight mapping table 210 for the in-flight instructions. In FIG. 2, each entry of the in-flight mapping table 210 identifies a given software thread, an in-flight instruction (e.g., opcode1, opcode3, opcode4, opcode5) of the given thread, an architected register referenced by the in-flight instruction, and a tag identifying a physical register that is currently assigned to that architected register. For example, the first entry indicates that a first instruction opcode1 of a first software thread $ST_1$ is an in-flight instruction referencing a first architected register GPR1 that is associated with a first physical register PR1.

When the processor 110 determines that it needs to determine the physical register corresponding to an architected register of an executing thread (e.g., source operand), it first checks the in-flight mapper 210. If the architected register of the thread is in the in-flight mapper 210, then it knows that a physical register has already been assigned and it can reference the associated entry to determine the associated physical register. For example, if the processor 110 needs to use GPR1 of thread $ST_1$, the processor 110 determines from the in-flight mapping table 210, that this architected register has been assigned to physical register PR1. However, if the processor determines that GPR1 of thread $ST_1$ is not present in the in-flight mapper 210, it next checks the architected mapping table 310 shown in FIG. 3.

As shown in FIG. 3, in an exemplary embodiment of the invention, the register mapping unit 600 of processor 110 maintains an architected mapping table 310 including a plurality of thread tables 315, and maintains a virtual register file 320 that contains M virtual registers VR1-VRM. The thread tables 315 include entries that are associated with virtual registers of the virtual register file 320 and physical registers of the physical register file 120. The physical register file 120 includes N physical registers PR1-PRN, where M and N are positive integers and M is greater than N. For example, if the number of physical registers is 50, and if each thread has 32 architected registers, and there are 4 active software threads, then M is 128 and N is 50, and there would be 128 virtual registers and 50 physical registers.

Since the virtual register file 315 contains the total number of architected registers required for all threads, its access time is relatively slower, while the physical register file 120 is sized for low access latency, to directly feed processor functional units. The virtual registers correspond to locations in the cache 150 or the main memory 140.

Each thread table among tables 315 is associated with a different software thread (e.g., $ST_1$, $ST_2$, ..., $ST_Z$), and includes one or more entries, where each entry is associated with a particular architected register, includes a bit (e.g., a V bit) indicating whether the architected register is associated with a virtual register stored in the virtual register file 320 or a physical register stored in the physical register file 120, and an index (e.g., VR/PR idx) identifying a given register among registers within the associated register file. For example, the V bit set to 1 indicates that the current version of the architected register should be fetched from the physical register file and the V bit set to 0 indicates the architected register is available only from the memory location associated with its virtual register. For example, the first thread table of FIG. 3 associated with thread $ST_1$ shows that the first architected register GPR1 referenced by thread $ST_1$ is associated with the 39th virtual register in the virtual file 320, and that the second architected register GPR2 referenced by thread $ST_1$ is associated with the second physical register of the register file 120.

As discussed above, if the architected register addressed by an instruction of a given thread is not present in the in-flight mapping table 210, the processor 110 checks the mapping table 310. If the tables 315 of the architected mapping table 310 indicate that the architected register is in the virtual register file 320, the processor 110 copies the contents of the virtual register in the virtual register file 320 associated with the architected register into a free physical register in the physical register file 120. Thus, when the processor 110 needs to access the contents of the architected register in the future it can access it from the faster physical register file 120. Once the copy has occurred, the processor 110 may add an entry to the in-flight mapping table 210, which shows the architected register being mapped to the free physical register. For example, the V bit of the corresponding instruction may be set to indicate the architected register is associated with a physical register and the register idx may be set to the index of the free physical register.

When either source or destination architected registers of an instruction are assigned, it may be necessary to evict a register from the physical register file 120. For example, if a physical register in the physical register file 120 is associated with an architected register of a thread that has not been used recently, the contents of the physical register may be copied into its corresponding virtual register so the physical register may be freed for use in the assignment. Accordingly, the eviction of physical registers may make use of a least recently used (LRU) strategy. In another embodiment, a predicted degree of use strategy is used to evict physical registers. For example, the processor 110 may perform a calculation to predict which of the currently assigned architectural registers are likely to be used next. The architectural registers that are least likely to be used next may have their corresponding physical registers unassigned. For example, those physical registers assigned to architectural registers that have a predicted degree of use below a threshold may be evicted. In an embodiment, the eviction is done proactively by a finite state machine (FSM) process that runs continuously in the background.

The FSM maintains a free-list that indicates the physical registers that are currently free to be used. When the contents of a currently assigned physical register are to be overwritten, the new contents may also be written through to the corresponding virtual register memory location. Once the writing has completed, it is safe to place the current physical register into the free-list, if needed. Entries may be removed from the free-list at dispatch when copying a virtual register from the virtual register file 320 to the physical register file. The FSM proactively attempts to maintain a minimum number of free-list entries by periodically evicting physical registers to the virtual register file 320.

In an exemplary embodiment, an external controller (e.g., 410) dynamically chooses for each thread the number of architected registers that should not be exceeded in the working set of the thread in order to maximize the performance of the system as a whole. This number may be at most the number of registers specified by the architecture of the processor. The external controller performs an analysis of the system to determine the usage of physical registers by each thread and the extent to which the system performance is being affected by architected register references not being found in the physical register file 120. Based on this analysis, the controller computes the ideal number of architected registers in the current working set for each of the active software threads. For example, the external controller may initially select a number for each active software thread that totals to less than the number of physical registers. For example, if there are 50 physical registers, and 4 active software threads, the external controller could decide that it will assign each active software thread 12 architected registers and it will be necessary to interrupt the currently executing software threads. If a compiler of the system has been previously used to compile the software threads to a different amount of registers, and if it is possible to compile the threads using a different number of registers, those software threads will be recompiled to use the new number of architected registers, and then placed back in the ready pool.

In an embodiment, the controller sends an interrupt signal to each hardware thread where a software thread is currently executing. In an embodiment, the interrupt signal indicates the current number of architected registers to use through software flags residing in designated locations in memory or in special-purpose registers. There may be a software flag for each active thread. In an embodiment, a runtime compiler 420 is configured to periodically check these software flags. If the runtime compiler 420 determines that the software flag of an active software thread indicates its number of architected threads needs to change, the runtime compiler 420 re-compiles the software thread to use the number of architected threads. If the re-compilation of the software thread is successful, it may cause the version of the software thread currently executing to stop. The processor 110 or the controller 410 may re-start the newly re-compiled software thread resuming execution from the point at which it was stopped. The controller may be implemented by hardware separate from the processor 110.

In a further embodiment, the software thread may be designed to periodically check the software flag at various points of execution. For example, if the software thread has determined that the software flag has changed, the software thread sends a signal or a command to the compiler informing the compiler that it needs to recompile the software thread using a different number of architected registers.

Figure 4:
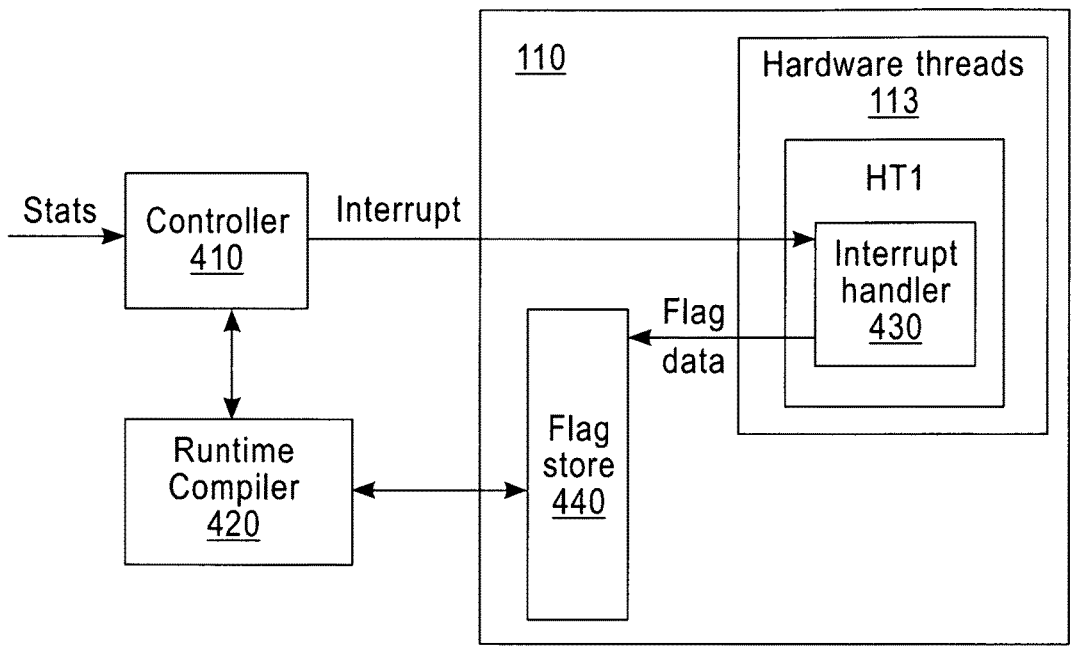
FIG. 4 illustrates the processor of the system interacting with a controller and a compiler according to an exemplary embodiment of the inventive concept.

FIG. 4 illustrates an arrangement of the controller 410, the compiler 420, and the processor 110 according to an exemplary embodiment of the inventive concept. The processor 110 includes a plurality of hardware threads 113. As shown in FIG. 4, the controller 410 analyzes statistics (stats) of the system to determine whether it should change the number of architected registers assigned to each active software thread. In an embodiment, the statistics indicate whether the system is thrashing. For example, if the system is thrashing when a certain number of architected threads are assigned to each of the active threads, the controller 410 can try increasing the certain number of architected threads to a higher value. In another embodiment, the statistics indicate a CPU usage percentage. For example, if the CPU usage is below a certain threshold, the controller 410 may decide to increase the number of architected registers per software thread. The controller 410 may decrease the number of architected if it finds too much spilling. If the number of architected registers used is below maximum, and there is almost no spilling, it is an indication that more architected registers can potentially be used to improve performance. An example of heavy use is an application where all threads are running the same loop, and where the compiler 420 has scheduled the code to use all the architected registers. After recompilation and running the program with fewer architected registers, some of the threads may be become idle. At this point, spilling will be almost non-existent, and it would help in the performance of the program to increase the number of architected registers for the remaining threads.

As shown in FIG. 4, when the controller 410 determines it will change the number of architected registers for a given software thread, it sends an interrupt to the interrupt handler 430 of the hardware thread (e.g., HT1) that is running the given software thread. In an embodiment, the receipt of the interrupt causes the hardware thread to stall the given software thread. The interrupt handler 430 can then send flag data to flag storage 440 to indicate that the number of architected registers for the given software thread is to change to a certain value. The compiler 420 can then check the flag storage 440 to determine the new number of architected registers for the given software thread and re-compile the given software thread using the new number.

Figure 5:
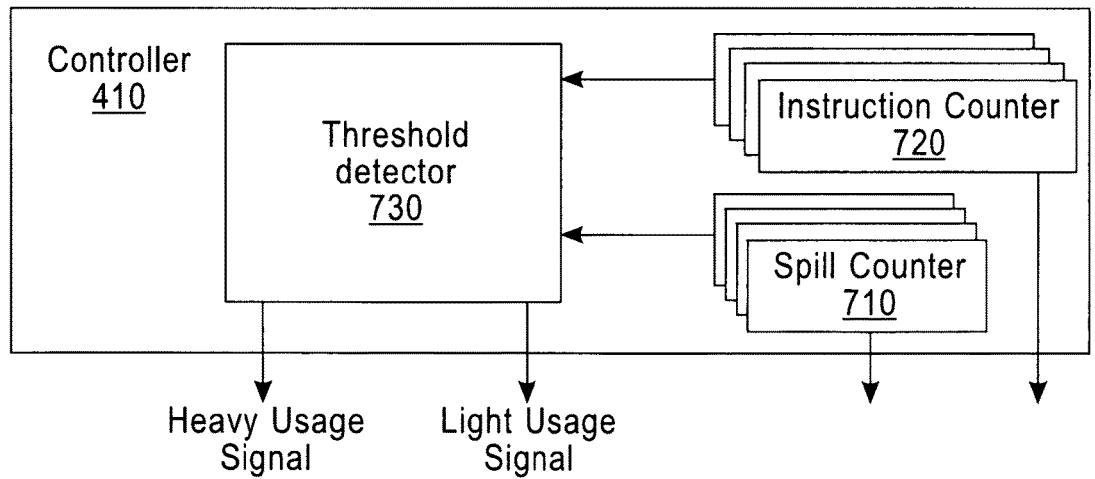
FIG. 5 illustrates an embodiment of a controller of FIG. 1.

FIG. 5 illustrates an exemplary embodiment of the controller 410. The controller includes two sets of counters, the spill counter set 710, one per thread, which counts the number of times each thread caused a spill, and the instruction counter set 720, which counts the number of instructions executed.

The counters are set to zero by the runtime compiler 420 before execution of the region that is to be monitored. The program is executed and the counters are stopped after a predetermined interval. The threshold detector 730 divides the spill count by the instruction count for each thread to get a usage factor. This is an indicator of whether the number of registers allocated to each thread is sufficient or not. If the usage factor is higher than a predetermined threshold, a heavy usage signal is set. If the usage factor is lower than another predetermined threshold, a light usage signal is set.

The heavy usage and light usage signals could be used in two ways. They could generate interrupts, or they could simply set special registers that can be read by the monitoring program (also called the runtime). As shown in FIG. 5, the values of the spill counters 710 and instruction counters 720 can also be read by the runtime compiler 420.

Figure 6:
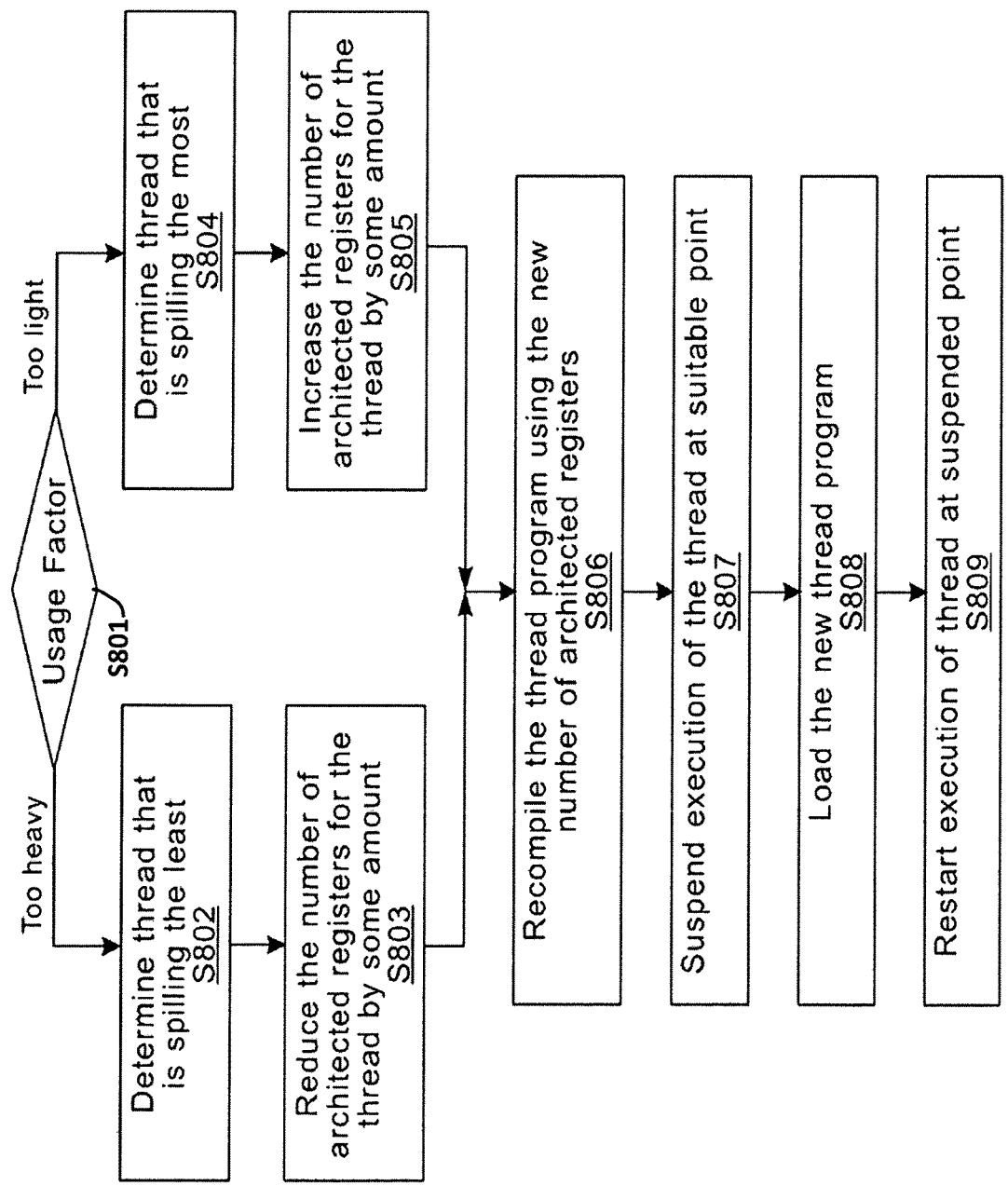
FIG. 6 illustrates a method of dynamically adjusting the number of architected registers for an active thread.

An exemplary embodiment for the recompilation is shown in FIG. 6. The heavy and light usage signals (either appearing as interrupts or as readable special registers) are used by the runtime compiler 420 to first determine the spilling behavior of all threads in the system. For this, the runtime compiler 420 will need to read all the spill counters 710 and instruction counters 720 shown in FIG. 5.

If the heavy signal has been triggered, then the runtime compiler 420 computes a candidate for which the allocated number of architected registers can be reduced. One example is to choose the thread that appears to have the least spills. Other schemes are possible. The number of architected registers used to compile this thread at last compilation is examined and that number is reduced by some amount, say a constant number, 2. Other amounts can be chosen.

If the light signal has been triggered, then the runtime compiler 420 computes a candidate for which the allocated number of architected registers can be increased. One example is to choose the thread that appears to have the most spills. Other schemes are possible. The number of architected registers used to compile this thread at last compilation is examined and that number increased by some amount, say a constant number, 2. Other amounts can be chosen.

The runtime compiler 420 then recompiles the chosen thread with the chosen number of architected registers. Compilation is done in a way that special points can be identified, e.g. end of loop iterations or subroutine calls, where execution can be suspended and resumed independent of the number of architected registers allocated.

Once the compilation is complete, the runtime compiler 120 determines an appropriate point to suspend execution of the identified thread, e.g. end of loop iteration or subroutine call. It replaces the old program with the newly compiled program, and restarts execution of the new program at a point corresponding to where it suspended execution of the old program.

Referring to FIG. 6, the method includes determining whether the usage factor is too light or too heavy (S801). If the usage factor is too heavy, the method determines the thread that is spilling the least (S802), and reduces the number of architected registers for the thread by a certain amount (S803). If the usage factor is too light, the method determines the thread that is spilling the most (S804) and increases the number of architected registers for the thread by a certain amount (S805). In both cases, the method next recompiles the thread program using the new number of architected registers (S806). Next, the method includes suspending execution of the thread at a suitable point (S807). Next, the method includes loading the new thread program (S808). Lastly, the method includes restarting execution of the thread at the suspended point (S809).

Figure 7:
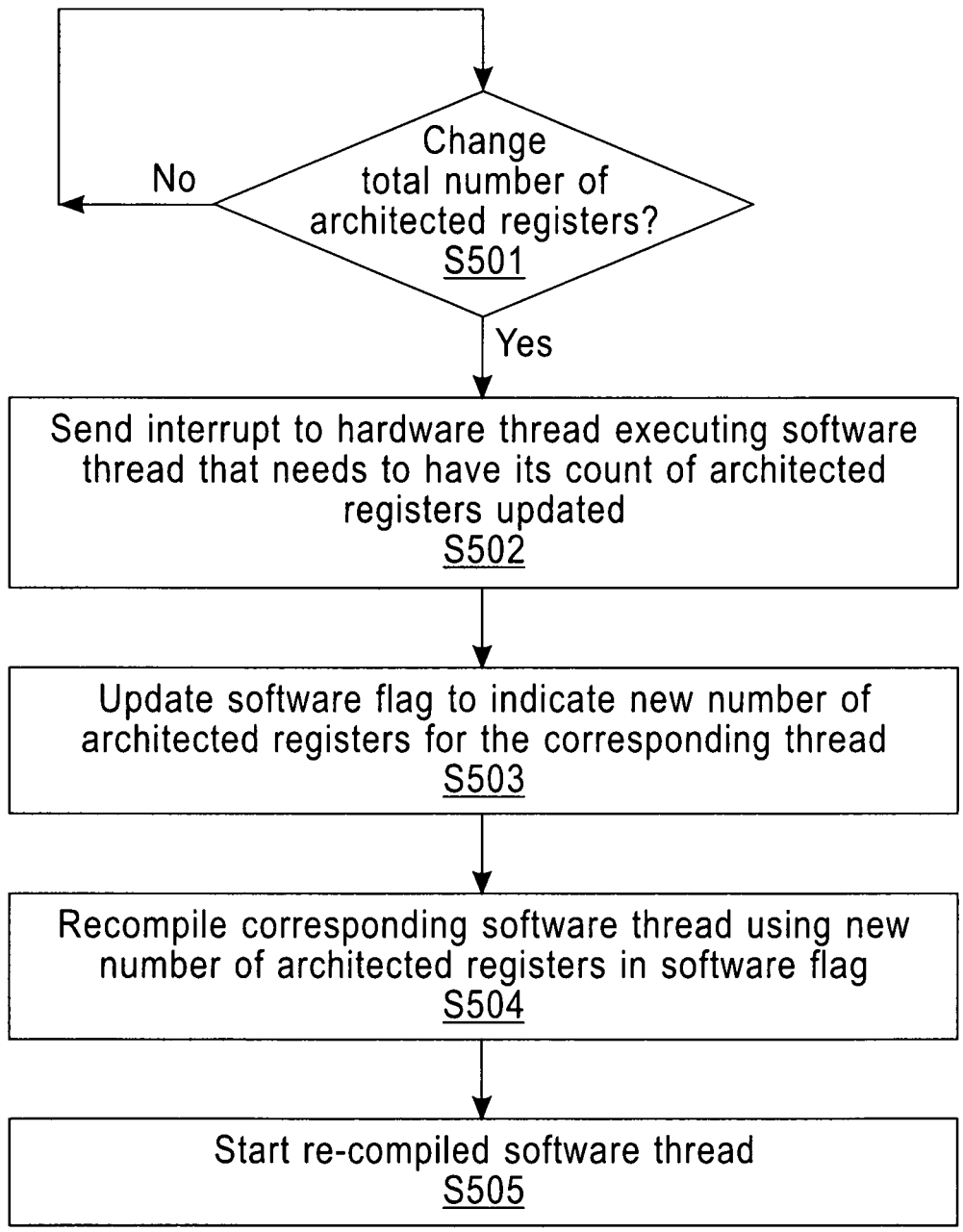
FIG. 7 illustrates another method of dynamically adjusting the number of architected registers for an active thread.

FIG. 7 illustrates a method of adjusting the total number of architected registers available to the active threads according to an exemplary embodiment of the inventive concept. The method includes a controller determining whether a change to the total number of architected registers is needed (S501). If no change is necessary, the method may delay for a period of time and re-perform the determination. If a change is required, the controller sends an interrupt to the hardware thread that is currently executing a software thread that will be affected by the change (S502). An interrupt handler of the software thread receives the interrupt, and in response updates a software flag to indicate a new number of architected registers for the software flag (S503). The interrupt handler may stall the software thread in response to the interrupt. The software flag may be stored in memory that is accessible to a compiler. The compiler may be executed by a hardware thread. The compiler compiles the corresponding software flag using the new number of architected registers in the software flag (S504). The compiler may be configured to periodically check a plurality of software flags, where each corresponds to a different one of a group of active software threads. In an embodiment, the software flag indicates whether a change has occurred and the value to change the number of architected registers to. In another embodiment, the software flag merely indicates whether to increase or decrease the number of architected registers for a given software thread. Once the software thread has re-compiled, the processor 110 starts the software thread (S505).

In an embodiment of the invention, if multiple threads are stalled, a round robin or priority policy is used to select one of the stalled threads to next process. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system comprising:
a processor comprising a plurality of hardware threads configured to execute a plurality of software threads and a physical register file including a plurality of physical registers, where an architecture of the processor specifies a certain number of architected registers;
a main memory comprising a virtual register file including a plurality of virtual registers; and
a controller configured to initially assign some of the architected registers to each of the software threads, monitor each of the software threads to determine whether a first number of the architected registers assigned to a first software thread among the software threads is sufficient, and assign a second number of the architected registers to the first software thread different from the first number when it determines that the first number is not sufficient,
wherein the processor includes a mapping table for each software thread indicating whether each of the architected registers assigned to the corresponding software thread is mapped to one of the physical registers in the physical register file or mapped to one of the virtual registers in the virtual register file,
wherein the controller comprises a spill counter for each of the software threads, where each spill counter generates a spill count indicating how many times the corresponding software thread causes contents of one of the physical registers associated with another one of the software threads to be copied to one of the virtual registers, and wherein the controller determines whether the first number of the architected registers assigned to the first software thread is sufficient based on the spill counts.

2. The computer system of claim 1, wherein the mapping table for a given software thread of the software threads includes an entry for each the architected registers assigned to the given software thread, wherein the entry includes a bit indicating whether one of the architected registers assigned to the given software thread is mapped to one of the physical registers in the physical register file or is mapped to one of the virtual registers in the virtual register file.

3. The computer system of claim 1, wherein the processor is configured to periodically free one of the physical registers.

4. The computer system of claim 3, wherein the processor frees the one physical register by selecting one of the physical registers and writing contents of the selected physical register to one of the virtual registers.

5. The computer system of claim 4, wherein the processor chooses the selected physical register using a least recently used strategy or a predicted degree of use strategy.

6. The computer system of claim 1, wherein the controller recompiles the first software thread to use the second number of the architected registers.

7. The computer system of claim 6, wherein the controller is configured to send an interrupt to one of the hardware threads that is executing the first software thread to assign the second number of the architected registers to the first software thread.

8. The computer system of claim 7, wherein an interrupt handler of the one hardware thread is configured to set a software flag to indicate assignment of the second number of the architected registers to the first software thread is to occur.

9. The computer system of claim 8, further comprising a compiler configured to re-compile the first software thread to use the second number of the architected registers upon accessing the software flag.

10. The computer system of claim 9, wherein the processor is configured to resume the re-compiled first software thread.

11. The computer system of claim 7, wherein an interrupt handler of the one hardware thread is configured to stall the first software thread upon receipt of the interrupt.

12. The computer system of claim 1, wherein the controller further comprises:
a plurality of instruction counters for each of the software threads, wherein each instruction counter generates an instruction count indicating how many instructions the corresponding software thread executed, and
wherein the controller determines whether the first number of the architected registers assigned to the first software thread is sufficient based on the split counts and the instruction counts.

13. The computer system of claim 12, wherein the controller, for each of the software threads, divides the spill count of the corresponding software thread by the instruction count of the corresponding software thread to determine a usage factor for the corresponding software thread, and the controller determines whether the first number of the architected registers assigned to the first software thread is sufficient based on the usage factors.

14. The computer system of claim 13, wherein the controller sets the second number to a value less than the first number when one of the usage factors is higher than a threshold and the usage factor of the first software thread indicates the first software thread is spilling the least among the software threads.

15. The computer system of claim 13, wherein the controller sets the second number to a value greater than the first number when one of the usage factors is lower than a threshold and the usage factor of the first software thread indicates the first software thread is spilling the most among the software threads.

16. The computer system of claim 1, wherein a given software thread of the software threads causes contents of one of the physical registers associated with another one of the software threads to be copied to one of the virtual registers when an instruction of the given software thread requires a new one of the architected registers and all of the physical registers are mapped.

* * * * *

UNITED STATES PATENT AND TRADEMARK OFFICE
CERTIFICATE OF CORRECTION

PATENT NO. : 10,831,537 B2
APPLICATION NO. : 15/435803
DATED : November 10, 2020
INVENTOR(S) : Harold W. Cain, III et al.

Page 1 of 1

It is certified that error appears in the above-identified patent and that said Letters Patent is hereby corrected as shown below:

On the Title Page

Item (72), reading:
- Inventors: Harold W. Cain, III, Raleigh, NC (US); Hubertus Franke, Cortlandt Manor, NY (US); Charles R. Johns, Austin, TX (US); Hung Q. Lee, Austin, TX (US); Ravi Nair, Briarcliff Manor, NY (US) -

Should read:
-- Inventors: Harold W. Cain, III, Raleigh, NC (US); Hubertus Franke, Cortlandt Manor, NY (US); Charles R. Johns, Austin, TX (US); Hung Q. Lee, Austin, TX (US); Ravi Nair, Briarcliff Manor, NY (US); James A. Kahle, Austin, TX (US) --

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*